Sept. 26, 1967     V. J. KLJUCHNIKOV ETAL     3,343,644
ARRANGEMENT FOR PRESETTING LOG LENGTHS
IN CROSS-CUTTING TREE LENGTHS
Filed July 19, 1965

United States Patent Office 3,343,644
Patented Sept. 26, 1967

3,343,644
ARRANGEMENT FOR PRESETTING LOG LENGTHS IN CROSS-CUTTING TREE LENGTHS
Vitaly Jurievich Kljuchnikov, Evgeny Borisovich Tsvetkov, Vasily Vasilievich Fetisov, and Anatoly Ivanovich Murlykin, Khimki, Mikhail Alexeevich Rudensky, Moskovskaya Oblast, and Ekaterina Nikolaevna Taruntaeva, Moscow, U.S.S.R., assignors to Tsentralny Nauchno-Issledovatelsky i Proektno-Konstruktorsky Institut Mekhanizatsii i Energetiki Lesnoi Promyshlennosti, U.S.S.R., Khimki ulitsa Moskovskaya
Filed July 19, 1965, Ser. No. 472,924
3 Claims. (Cl. 198—1)

The present invention relates to apparatus for presetting the length of logs obtained by cross-cutting tree trunks. The known apparatus for presetting log lengths comprises a stationary frame with a roller conveyer and sliding catchers located in the guides of this frame.

A disadvantage of the known log length presetting apparatus is the relatively low rate of feed of tree trunks, since a high feed rate produces breakage of the catchers struck by the tree trunks in their travel along the roller conveyer.

A principal object of the present invention is to increase the travelling speed of the tree trunks, thus raising the production rate of the apparatus and, consequently, the respective yield of commercial wood.

Another object of this invention is to increase the effectiveness of absorbing the kinetic energy of the travelling tree trunks. According to the invention these objects are achieved by providing in the upper part of the stationary frame a flat horizontal frame capable of longitudinal reciprocal movement, and provided with rearrangeable cross bars, the lower part of said frame being provided with articulated sliding catchers interacting with said bars. The stationary frame can further be provided with a device for absorbing the impact of the tree trunks against the catchers and for returning the flat horizontal frame to its initial position.

Figure 2:
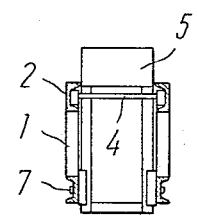
Figure 1:
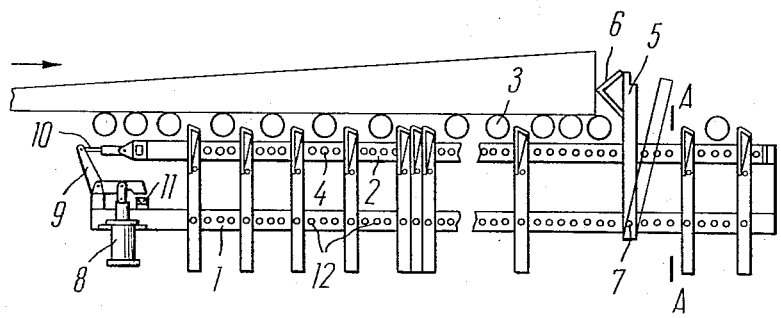

For a better understanding of the invention and the objects and advantages thereof, reference is now made to the following description of an embodiment of the present invention, and the accompanying drawings, wherein:

FIG. 1 is a side elevation of apparatus for presetting the length of logs which are cross-cut from the tree trunks; and FIG. 2 is a sectional view along line A—A of FIG. 1.

In the drawing, there is shown a stationary frame 1 with a roller conveyer 3; a flat horizontal frame 2 with rearrangeable cross bars 4 (FIG. 2); sliding catchers 5 (FIG. 1) with swinging members 6; said catchers being attached to the stationary frame by means of hinges 7 and interacting with the rearrangeable cross bars 4 (FIG. 2) while the frame 2 shifts in the direction of travel of the tree trunks; a buffer device for absorbing the impact of a tree trunk against the catcher and for returning the flat horizontal frame to its initial position, said device comprising a fixed hydraulic cylinder 8 (FIG. 1) the piston-rod of which is associated with the flat horizontal frame 2 and a guard bumper 11 by means of a two-arm lever 9 and a shackle 10. The stationary frame 1 is provided with holes 12 for rearranging the sliding catchers when readjusting the arrangement from one preset log-length to another.

The apparatus for presetting the log-lengths when cross-cutting tree trunks operates as follows:

Prior to starting the operation of the apparatus rearrangeable cross bar 4 and catcher 5 are set into a position predetermining the required length of logs to be cut from a tree trunk. The drive of the feed roller conveyer is started, and a tree trunk begins moving along the roller conveyer and contacts the swinging member 6 of catcher 5. A switch (not shown) in the member 6 sends a signal to disengage, that is, to stop the roller conveyer 3. The swinging member 6 is thrust against the catcher 5 and thus presses upon the rearrangeable cross bar 4, and hence, upon the flat horizontal frame 2, which is displaced in the direction of travel of the tree trunk and presses through the two-arm lever 9 and the shackle 10 upon the piston rod of the cylinder 8, which is subjected to constant pressure.

Thus, all the kinetic energy of the moving parts of both the apparatus and the tree trunk is absorbed. In case a tree trunk delivers a particularly heavy shock upon a catcher, the lever 9 contacts rubber bumper 11 which serves a shock absorbing function. After absorption of the energy, the piston of cylinder 8 urge the flat horizontal frame to return to its initial position while catcher 5 aligns the ends of the logs. After the flat horizontal frame 2 has returned to its initial position, the tree trunk is cross-cut and the obtained log is pushed aside.

What is claimed is:

1. Apparatus for presetting the position of tree trunks to be cross-cut into logs, said apparatus comprising a stationary frame, roller conveyer means on said frame for transporting tree trunks thereon; a flat horizontal frame with rearrangeable cross bars, said flat frame being supported on the stationary frame on the upper portion thereof for longitudinal reciprocal movement in relation to said stationary frame; sliding catchers for arresting tree trunks on the conveyer means, said catchers being hingedly attached to said stationary frame and interacting with said rearrangeable cross bars of said flat horizonal frame, and buffer means coupled to said flat frame for yieldably resisting displacement of said flat frame and for returning the same to its original position, thereby absorbing impact applied to the catchers by the tree trunks.

2. Apparatus as claimed in claim 1 wherein said buffer means comprises a fixed hydraulic cylinder including a piston rod, and a lever system connecting the piston rod of the hydraulic cylinder with said flat frame.

3. Apparatus as claimed in claim 2 wherein said buffer means further comprises a resilient bumper positioned adjacent the lever system for contact therewith when the flat frame is displaced beyond a prescribed amount.

References Cited

UNITED STATES PATENTS

| 1,721 | 8/1840 | McDowell | 143—46 |
|---|---|---|---|
| 13,351 | 7/1855 | Field | 143—46 |
| 592,564 | 10/1897 | Greenleaf | 83—467 |
| 2,189,086 | 2/1940 | Seagren | 83—467 |
| 2,642,663 | 6/1953 | Long | 33—132 |
| 2,924,323 | 2/1960 | Holben | 198—1 |
| 3,141,367 | 7/1964 | Keener et al. | 83—467 X |
| 3,229,733 | 1/1966 | Albers | 143—46 |
| 3,229,734 | 1/1966 | Albers | 143—47 |

FOREIGN PATENTS

| 251,139 | 7/1961 | Australia. |
|---|---|---|
| 124,095 | 6/1959 | U.S.S.R. |

EVON C. BLUNK, *Primary Examiner.*

M. L. AJEMAN, *Assistant Examiner.*